(12) United States Patent
Volkmann et al.

(10) Patent No.: US 10,328,891 B2
(45) Date of Patent: Jun. 25, 2019

(54) METHOD TO MANUFACTURE AIRBAG MINI PACKS

(71) Applicant: Key Safety Systems, Inc., Sterling Heights, MI (US)

(72) Inventors: Matthias Volkmann, Kronberg (DE); Martin Pieruch, Hochheim (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 170 days.

(21) Appl. No.: 15/520,869

(22) PCT Filed: Oct. 27, 2015

(86) PCT No.: PCT/US2015/057491
§ 371 (c)(1),
(2) Date: Apr. 21, 2017

(87) PCT Pub. No.: WO2016/069543
PCT Pub. Date: May 6, 2016

(65) Prior Publication Data
US 2018/0022305 A1    Jan. 25, 2018

Related U.S. Application Data

(60) Provisional application No. 62/069,087, filed on Oct. 27, 2014.

(51) Int. Cl.
| | |
|---|---|
| *B60R 21/237* | (2006.01) |
| *B60R 21/235* | (2006.01) |
| *B29K 105/00* | (2006.01) |
| *B29C 43/12* | (2006.01) |

(Continued)

(52) U.S. Cl.
CPC ............ *B60R 21/237* (2013.01); *B29C 43/12* (2013.01); *B60R 21/20* (2013.01); *B60R 21/235* (2013.01); *B29K 2105/256* (2013.01); *B29L 2031/30* (2013.01); *B60R 2021/2375* (2013.01); *B60R 2021/23509* (2013.01); *B60R 2021/23557* (2013.01)

(58) Field of Classification Search
CPC ..... B60R 21/237; B60R 21/20; B60R 21/235; B29C 43/12
See application file for complete search history.

(56) References Cited

U.S. PATENT DOCUMENTS

| | | | | |
|---|---|---|---|---|
| 5,846,620 A | * | 12/1998 | Compton | ................ B32B 27/08 428/35.7 |
| 7,549,271 B2 | * | 6/2009 | Miwa | ..................... B60R 21/20 53/436 |

FOREIGN PATENT DOCUMENTS

EP    1031473 A2    8/2000

\* cited by examiner

*Primary Examiner* — Faye M Fleming
(74) *Attorney, Agent, or Firm* — Markell Seitzman; David L. King (57) ABSTRACT

A method of forming an airbag cushion (10, 10A) has the steps of providing placing the cushion in a vacuum bag (20) and evacuating the air shrinking the airbag cushion (10, 10A) to a compacted size; conforming the airbag cushion to a predetermined shape; placing the airbag cushion (10, 10A) in a high temperature environment between +50° C. to +140° for a predetermined time to thermally set the fabric material (120) to maintain the compacted airbag cushion (10, 10A) to the predetermined shape; and releasing the vacuum and removing the thermally set airbag cushion (10, 10A) from the vacuum bag (20).

10 Claims, 8 Drawing Sheets

(51) Int. Cl.
*B60R 21/20* (2011.01)
*B29L 31/30* (2006.01)

METHOD TO MANUFACTURE AIRBAG MINI PACKS

TECHNICAL FIELD

The present invention relates to airbag cushions generally and more specifically a method for manufacturing the airbag into small mini packs.

BACKGROUND OF THE INVENTION

Vehicle compartments are stored with plenty of features and technologies; therefore the space for each individual component is more and more limited. Airbag modules have to become smaller for each new generation of vehicles. One major issue is the volume of the folded cushion pack defines the size of the housing and cover. To receive a small package the cushion has to be packed under high load into a small housing or plastic shell and consequently the cushion pack is applying high reaction loads to its surrounding environment. Soft Pack modules, as they are called, for curtain and seat backs for instance don't have separate covers that could support this tight packaging.

In seat mounted airbags, the folded airbag can create unsightly bulges. In curtain airbags mounted in roof rails, the cushion material needs to be hand stuffed into a long narrow channel. Accordingly, the size of the folded material is critical.

It is an object of the present invention to provide a fully functional airbag pack that occupies less space without sacrificing the inflation volume of the airbag or weakening the strength and overall physical characteristics of the cushion material. These and other advantages are achieved by the invention as described hereinafter.

SUMMARY OF THE INVENTION

The present invention relates to a method of forming a mini pack airbag cushion having the steps of providing an airbag cushion made of fabric material; placing the cushion in a vacuum bag and evacuating the air shrinking the airbag cushion to a compacted size; conforming the airbag cushion to a predetermined shape; placing the airbag cushion in a high temperature environment between +50° C. to +140° C. for a predetermined time to thermally set the fabric material to maintain the compacted airbag cushion to the predetermined shape; and releasing the vacuum and removing the thermally set airbag cushion from the vacuum bag, the cushion maintaining the predetermined shape being formed as a mini pack airbag cushion. The predetermined time to thermally set the material is preferably in the range of 20 seconds to 2 hours. Preferably the relaxed folded mini pack airbag cushion retains a size reduction in thickness in the range of 20% to 40% compared to the same cushion folded but not processed using this method.

The method further can have the steps of providing a shape forming contoured mandrel surface upon which the airbag cushion is positioned, so it can follow the contour during the steps of pulling a vacuum; applying a compression load or force on the evacuated airbag cushion during the step of thermally setting the fabric material and removing the compression force prior to removing the airbag cushion from the vacuum bag; or folding the airbag cushion prior to placing in the vacuum bag.

The method may further have the steps of inserting an inflator simulator in the cushion to mimic the shape of an inflator; assembling the airbag cushion about a curtain airbag manifold pipe prior to the step of evacuation; or placing the formed mini pack airbag cushion in the airbag module housing. The airbag module can be of a reduced size to form a micro module. The method may further have the step of attaching an inflator after finishing the process. A mini pack airbag cushion can be made by the method. The mini pack airbag cushion can include micro module housing or a module for storing the mini pack airbag cushion.

BRIEF DESCRIPTION OF THE DRAWINGS

The invention will be described by way of example and with reference to the accompanying drawings in which.

DETAILED DESCRIPTION OF THE INVENTION

Figure 1:
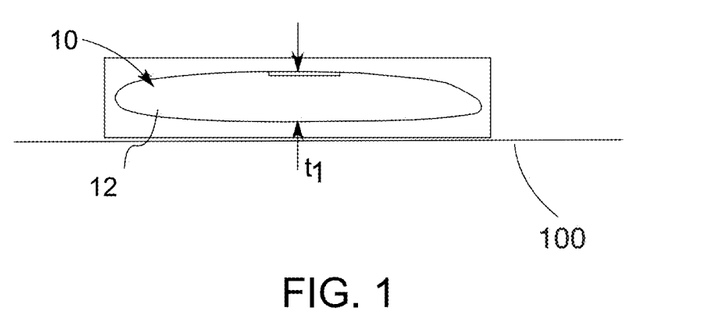
FIG. 1 is a side view of an exemplary embodiment airbag cushion showing a thickness $t_1$.
Figure 2:
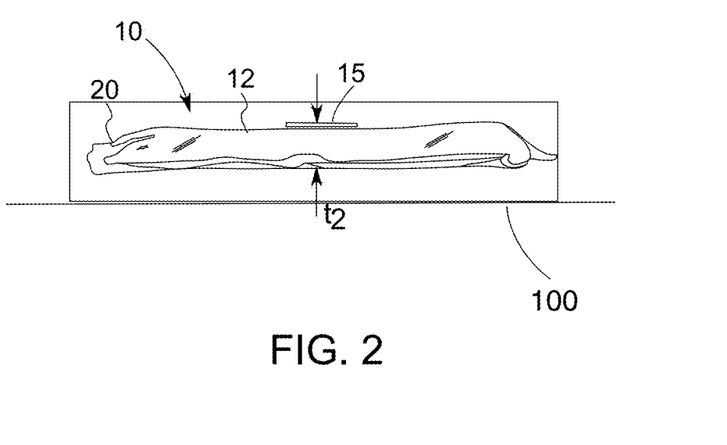
FIG. 2 is the airbag cushion of FIG. 1 placed in a vacuum bag and compressed to a thickness $t_2$.
Figure 9:
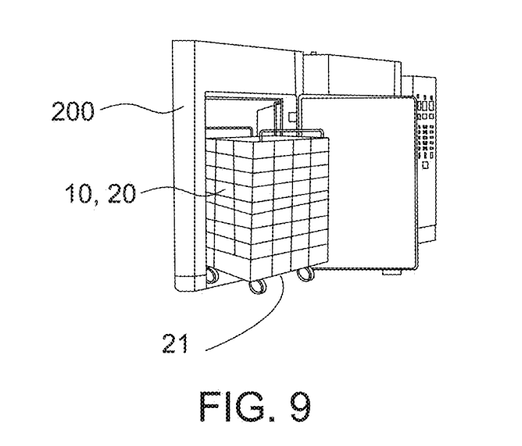
FIG. 9 is an exemplary view of a plurality of cushion airbags placed in vacuum bags and placed into an elevated heating chamber to produce a thermal set according to the method of the present invention.

With reference to FIGS. 1-4, an exemplary airbag cushion 10 is illustrated and the process of the present invention explained. The airbag cushion 10 is folded and as illustrated has a thickness $t_1$ of approximately 38 mm. This initial cushion thickness is shown at approximately the mid location of the airbag cushion 10. With reference to FIG. 2, a clear generally plastic vacuum bag 20 has been placed around the folded airbag cushion 10 of FIG. 1 and a vacuum has been pulled or applied and the airbag has been compressed such that it has a compressed cushion thickness $t_2$ of 16 mm. This compressed thickness $t_2$ is substantially thinner by a large margin when compared to the initial cushion thickness $t_1$ of 38 mm. To achieve this thickness, the airbag cushion 10 preferably is placed on a vacuum table 100, held in position and a vacuum is applied as illustrated in FIGS. 1 and 2 as well as in FIGS. 5 and 6. This vacuum is preferably well below 1 atmosphere and preferably in a range of 1 millibar to 50 millibar. Once positioned, a high temperature of up to 200 degrees C. can be applied for a short time to conform or set the fabric to the mandrel 102. The airbag shown in FIG. 1 has already been folded. The airbag 10, as mentioned, can then be placed in a vacuum bag 20 and a vacuum can be pulled to reduce the thickness of the airbag 10 down to 16 mm. This is preferably achieved by applying not only vacuum, but a pressure on the airbag 10 squeezing it down tightly using flat plates or presses 15 into this very flat and constrained condition. This pressure is also enhanced by atmospheric pressure. Once the airbag 10 is in this condition it can then be placed in a rack 21 with a plurality of other airbags 10 similarly compressed in vacuum bags 20 and placed in an elevated heating chamber 200 as illustrated in FIG. 9. In FIG. 9 the rack 21 is shown partially inside of the chamber 200 with the chamber door 202 open.

Figure 3:
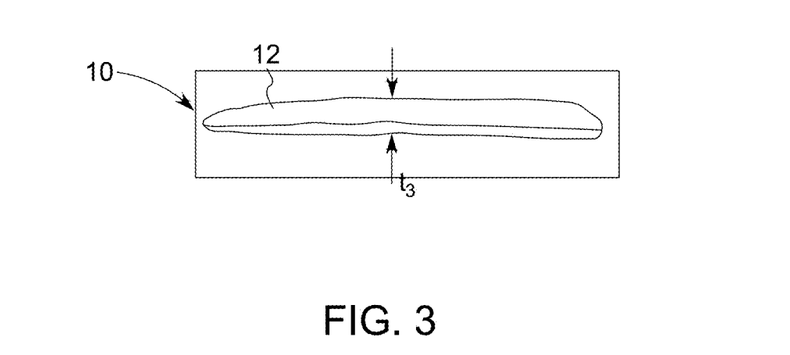
FIG. 3 is the relaxed cushion after being processed using the inventive method of the present invention showing a relaxed thickness $t_3$.

Preferably the heating chamber 200 is set at a temperature of 50 to 140 degrees C. The airbag 10 is then left in the heating chamber for a predetermined amount of time. Depending on the temperature, this time can be as short as 20 seconds or preferably extends to about 2 hours. In a preferred embodiment, the airbag 10 of FIG. 1 was held in a chamber at an elevated temperature for approximately 1.5 hours at a temperature of approximately 85 degrees C. At this temperature, the airbag 10 when removed is allowed to cool and then is pulled out of the vacuum bag 20. The vacuum bag 20 can be reusable or it can be disposable. In any event, the airbag cushion 10, when allowed to cool and pulled from the vacuum bag 20 will retain its shape at a level as illustrated in FIG. 3 wherein the relaxed cushion thickness $t_3$, after being thermally set and evacuated in the vacuum bag 20, will have a thickness $t_3$ of approximately 22 mm.

Figure 4:
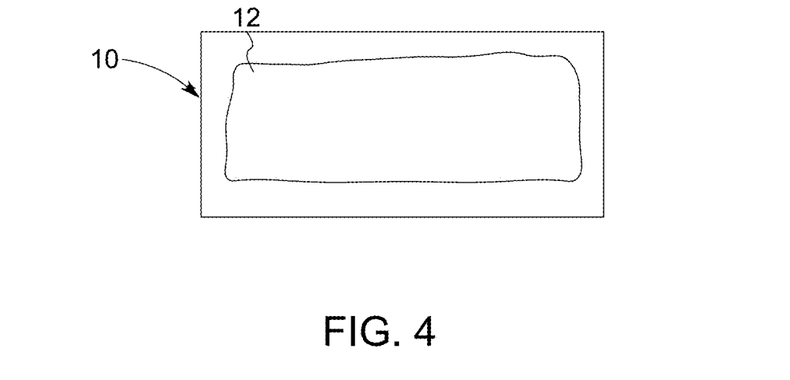
FIG. 4 is a top view of the airbag cushion treated according to the present inventive method as shown in FIG. 3.
Figure 5:
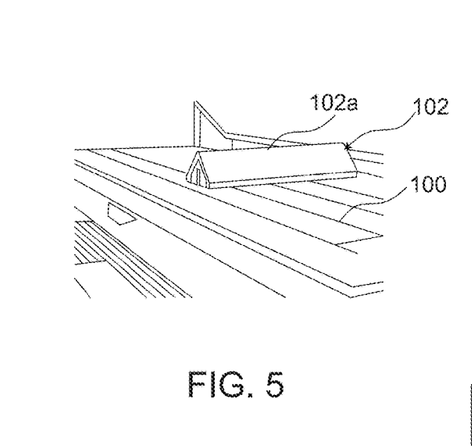
FIG. 5 is a view of an exemplary vacuum forming machine having a mandrel with a contoured predetermined shaped surface.
Figure 5A:
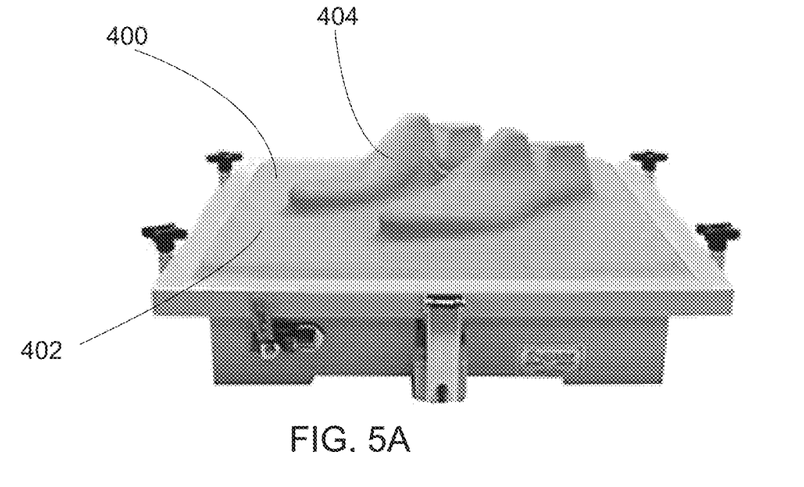
FIG. 5A illustrates how a vacuum membrane using vacuum can be made to envelope a product such as a pair of shoes 404.
Figure 6:
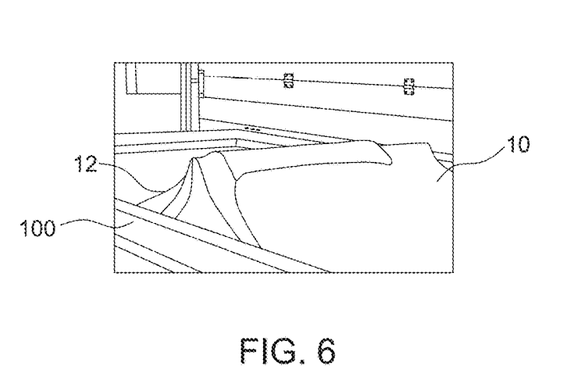
FIG. 6 shows the folded airbag cushion being placed over the mandrel of the vacuum machine and treated by a vacuum membrane.

A top view of the flattened and compressed airbag 10 is illustrated in FIG. 4. The top is basically unaltered, but the thickness of the airbag cushion 10 is drastically reduced. The airbag cushion 10 once processed through this methodology is able to retain this relaxed cushion thickness $t_3$ for over 3 months, most likely indefinitely, without any additional physical constraints binding the processed airbag 10. A reduced size airbag 10 in its pre-inflated state is very valuable. The inventors call this reduced size folded airbag cushion a "mini pack". The present invention allows the use of relatively large airbag cushions to be compressed or compacted to occupy smaller spaces without sacrificing any protective cushioning of occupants often afforded by inflated larger sized airbag cushions. The mini pack airbag cushion 10 takes on a size that is at least 20 to 40 percent or more, smaller than a normally folded airbag cushion. Being able to provide an airbag cushion of a compacted size is particularly important when the airbag cushion 10 is used in the side or back of a seat in that there is often not sufficient room for a large size airbag cushion, not employing the present invention to be compressed in the seat back. Furthermore, when the prior art airbag cushions are typically placed in this condition, if they are not properly constrained such as by using the present invention to a small size, bulges occur on the seat back that are unsightly and unacceptable. With the mini pack airbag cushions 10, these side airbag cushions 10 can easily be contained within the seat upholstery so that more seat padding can be provided around the seat cushion for a more comfortable seat and yet still providing side airbag protection. With reference to FIGS. 5 and 6 the vacuum table 100 can employ a fixture, die or mandrel 102 having a contoured or profiled surface 102*a* such that the airbag 10 when draped over the surface 102*a* of the mandrel 102 can be drawn down tightly over the mandrel 102 once a vacuum membrane if placed over the airbag or material. Once positioned, a high temperature of up to 200 degrees C. can be applied for a short time to conform or set the fabric to the mandrel 102. When this is accomplished a preset in the cushion can be achieved and a thermal set can be formed into the cushion material directly such that the fabric takes on the contour of the underlying forming fixture, die or mandrel 102. FIG. 5A illustrates how a vacuum membrane 400 of a vacuum machine 402 using vacuum can be made to envelope a product such as a pair of shoes 404 or in the context of the present invention a folded airbag.

Figure 7:
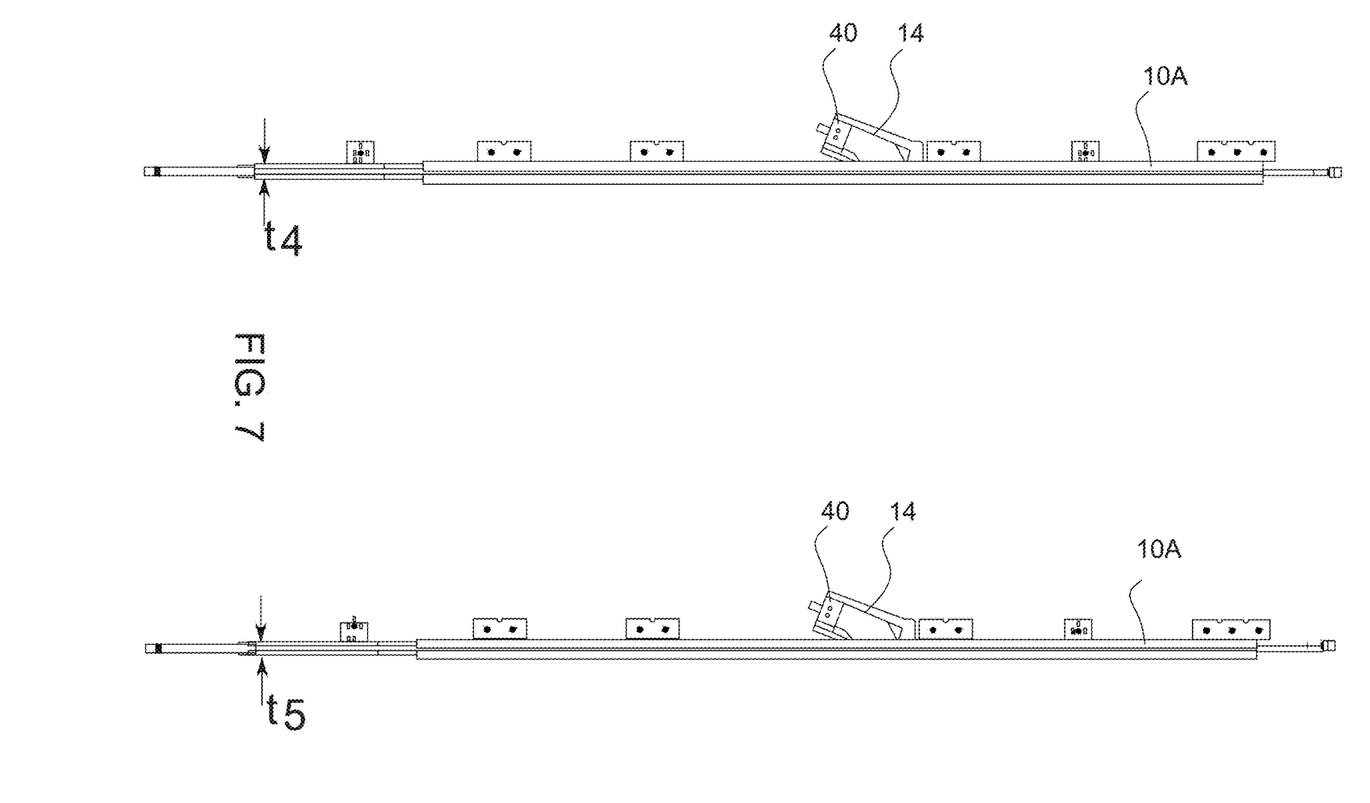
FIG. 7 is a view of an exemplary curtain airbag; the top view showing the airbag cushion prior to being treated by the present invention; the lower view showing the same airbag cushion after being treated using the present invention showing a reduction in the overall thickness of the airbag along its longitudinal length.

With reference to FIG. 7, an exemplary curtain airbag cushion alternative embodiment 10A is shown. As shown in the upper configuration, the airbag 10A is shown as a longitudinally extending curtain airbag that has been rolled or wrapped in such a fashion that it has a thickness $t_4$ in the normal relaxed and unconstrained condition and yet after being treated using the method of the present invention, the curtain airbag 10A as illustrated in the lower configuration has been compacted dramatically to a thickness $t_5$ that is substantially smaller than the typical untreated curtain airbag. This is a huge advantage in that a curtain airbag 10A using the present invention can easily be mounted into a roof rail structure occupying substantially less space than is typically required.

An important aspect of the invention is that airbag cushions 10A of the present invention often require inflators 40 to be inserted into a pocket 14 within the airbag cushion 10A shown in FIG. 7. These inflators 40 generally are filled with a propellant and are therefore not suitable to be processed at high elevated temperatures over a period of time, therefore, active propellant filled inflators are not placed with the airbag into the chamber 200 as a safety precaution. To avoid this and still be able to configure the mini pack airbag 10 properly, dummy inflators or simulators of the same size and shape of the inflator 40 are used. The dummy inflators act to permit the airbag cushion to achieve a proper shape or profile. The dummy inflators are replaced by the real inflators 40.

Figure 8:
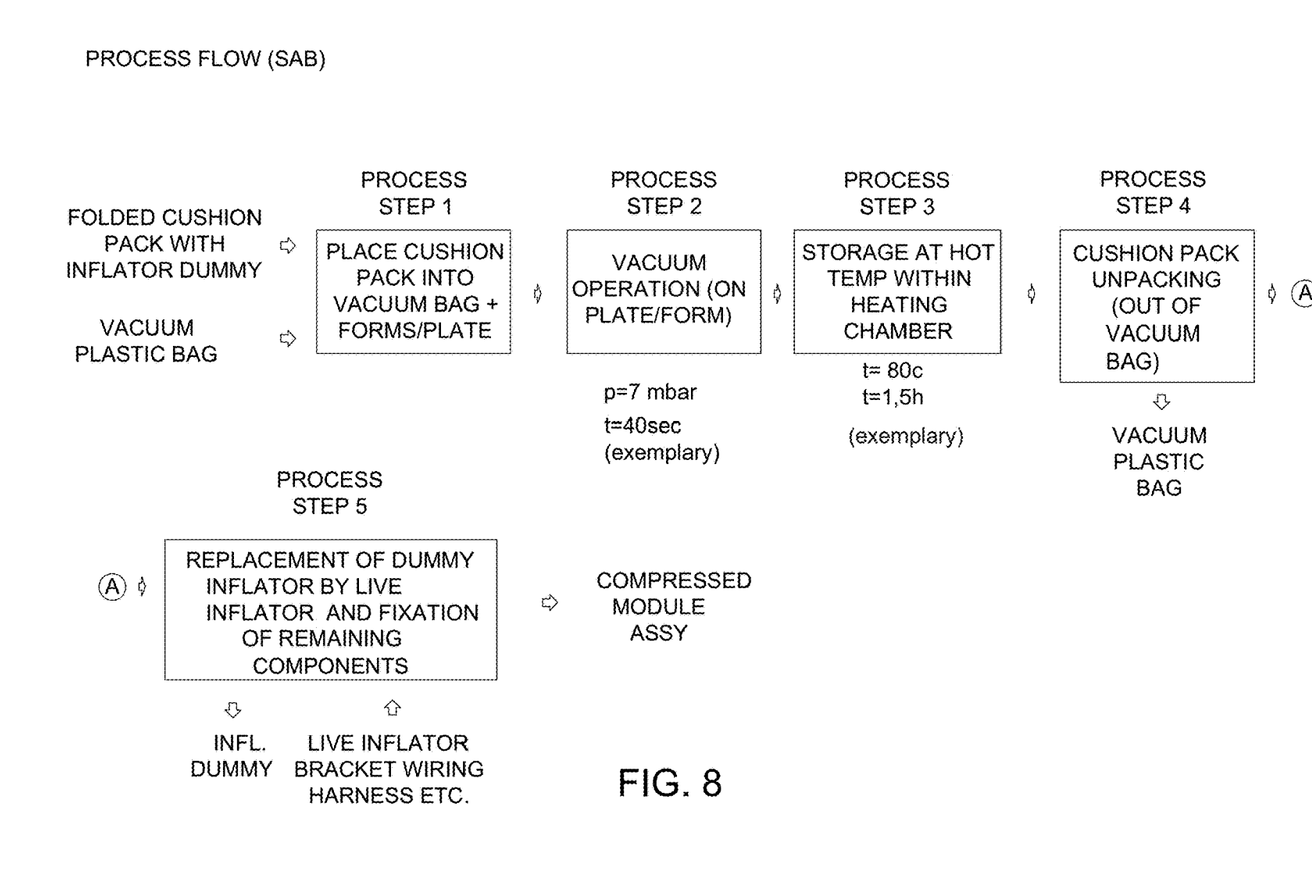
FIG. 8 is a diagrammatic flow chart showing the steps used in the present invention.

Reference is made to FIG. 8, a diagrammatic process chart showing the process flow of an exemplary airbag 10. Prior to step one the airbag is folded and the inflator replaced with a dummy inflator. Also any brackets and wiring harnesses are removed. Then in step two, a vacuum operation is conducted on the bagged cushion. One or more plates can be used to provide an additive compressive pressure or specific package shape and the bag as the vacuum is applied. This vacuum has a negative pressure 7 mbar and is held for example at that for approximately 40 seconds. At step three, the airbag 10 is then stored at a hot temperature within a heating chamber, currently a preferred temperature is approximately 85 degrees C. and a time of approximately 1.5 hours. In step four, the cushion pack is unpacked and removed from the vacuum bag 20. Preferably, the unpacking can occur when the airbag 10 has cooled. At process step five, the dummy inflator is removed and replaced with a live inflator 40 fixing it in the cushion airbag 10 along with the remaining components of the airbag module which could include a bracket and wiring harness (not illustrated). This last step completes the assembly of the mini pack airbag cushion 10, which can then be installed in a seat back or curtain rail or other suitable location with no other packaging required.

Figure 10:
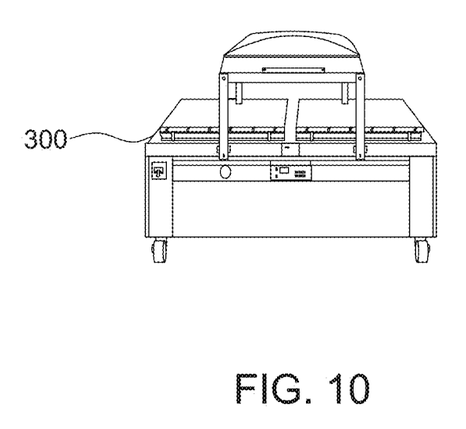
FIG. 10 is an exemplary vacuum chamber apparatus to which the airbag when placed in a vacuum bag can be placed in to evacuate the airbag cushion and vacuum bag.

As mentioned and with reference to FIG. 9, the airbags 10 with vacuum bags 20 have been placed onto a rack 21 and then placed inside the elevated heating chamber 200 as illustrated. Prior to being packaged for thermal setting the cushion fabric material has been processed on a vacuum machine 300 as illustrated in FIG. 10. To speed the process a double chamber vacuum machine 300 can be used. The vacuum machine 300 provides the ability to place the folded airbag 10 into a vacuum bag 20, sealed and then a vacuum pulled so the air inside the vacuum bag 20 is completely withdrawn as best as possible to completely pull the airbag 10 into its thinnest possible configuration. In addition to the vacuum, pressure can be applied to the airbag 10 to assist in compressing the airbag 10 to its thinnest possible thickness. As shown in FIG. 2, the illustrated airbag 10 achieves a compressed thickness $t_2$ of approximately 16 mm in the first exemplary embodiment.

Figure 11:
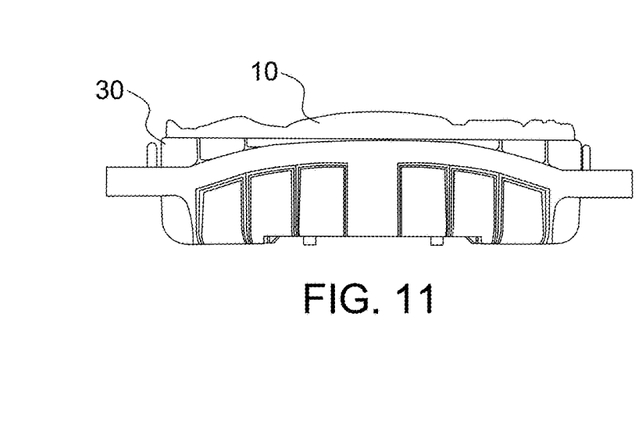
FIG. 11 is the airbag module showing a typical airbag cushion extending above the surface of the module structure.
Figure 11A:
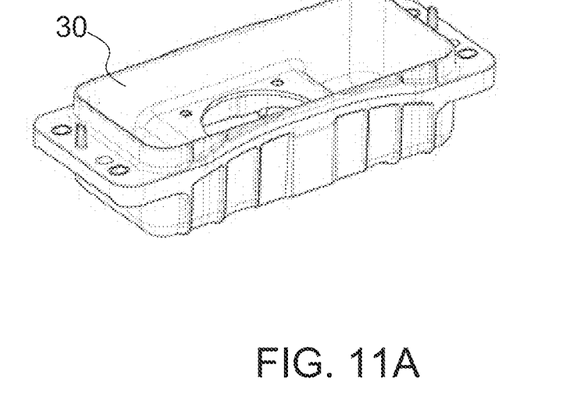
FIG. 11A is an isometric view of the housing of FIG. 11.
Figure 12:
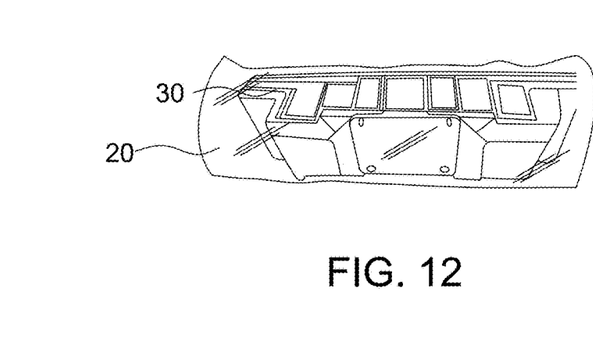
FIG. 12 is an exemplary airbag module shown in a view placed inside a vacuum bag prior to treatment according to the present invention.
Figure 13:
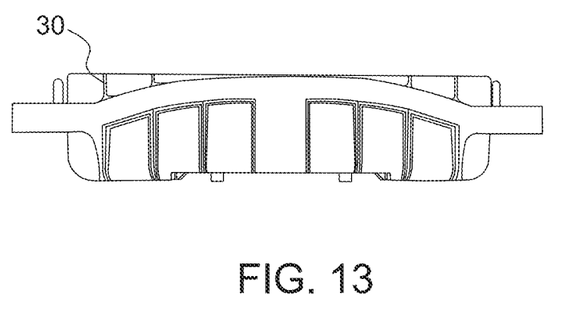
FIG. 13 is a side view wherein the airbag module is shown in a min pack cushion made according to the present invention hidden by the walls of the chamber and is lying below the surface of the walls as opposed to that in FIG. 12.

With reference to FIGS. 11-13, as an alternative, the entire process can also be conducted using an airbag 10 situated in an airbag module housing 30. A typical airbag cushion not made with the size reducing method, when normally stowed, projects above the open end or mouth of the airbag module housing 30 as illustrated in FIG. 11. When both this airbag 10 and module assembly 30 are pre-assembled and placed in a vacuum bag 20 as illustrated, a vacuum can be pulled sucking the airbag 10 down substantially into a smaller shape and one defined by the housing 30. When this occurs, the side view of the assembled module after treatment using the above process completely hides the airbag cushion 10 inside the housing 30 such that it does not bulge out of the module housing 30 in any fashion, as illustrated in FIG. 13.

The present method of heat setting the cushion fabric material relaxes any tensioning that the fabric would normally have trying to unfurl or open itself from its folded condition. As shown, airbags with different fabric materials can be treated typically the airbag 10 is a woven fabric of a polyethylene construction or similar polymer or nylon; however, these airbags can also be coated or uncoated. When coated, typically a silicon coating or other material is applied that adds to the memory of the airbag when simply folded. These materials and coatings make the airbag want to occupy more space than is desirable. However, using the present method, compressions in the average of 22 to 27 percent are achieved and once achieved a minor relaxation can occur over time at approximately only 2 to 3 percent overall yielding a substantially thinner airbag cushion 10 compared to untreated airbags. Prior art cushions, when compressed using only vacuum, over time expand back to almost the original size showing a relaxation of about 100 percent. These mini pack airbag cushions 10 are able to maintain this compressed or reduced size configuration indefinitely without any additional external constraints. No external packaging or tie downs are needed to keep the airbag 10 in this reduced size shape due to the fact that the fabric material 12 has been set thermally with the high temperature exposure. A variety of tests were conducted. In a test, a force of 8000 Newtons was applied to the airbag over a time of 1.5 hours at a low temperature of 50 degrees C. Under this condition, the maximum compression was 27 percent and the maximum relaxation was 5 percent. In a second test, a force of 8000 Newtons was applied over a time of 1.5 hours and a temperature of 85 degrees C. A 23 percent maximum compression was achieved and a 4 percent relaxation. In a third test of 8000 Newtons for 1.5 hours at 105 degrees C., a 27 percent maximum compression was achieved with a maximum relaxation of only 3 percent. Interestingly, in a fourth series of tests a force of 3000 Newtons over 1.5 hours at 85 degrees C. achieved a 23 percent compression and a maximum relaxation of 4 percent. Testing of cushion airbag materials using vacuum only or pressure only resulted in similar compressive capabilities, however the fabric material 12 over time simply relaxes back to the original shape or very close to it. In the present invention, by thermally setting the fabric material 12 into the compressed shape, the airbag cushion 10 has no tendency to relax back to the original shape; the airbag cushion has a permanent memory set at this reduced compressed thickness. The method has been successfully demonstrated for use with coated or uncoated fabric materials 12 and can be used on polyester, nylon and any other suitable airbag cushion material regardless of the denier and weave density of the fabric. This is a great advantage in the mini pack airbag cushion 10 of the present invention.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of forming a folded airbag cushion (10, 10A) comprises the steps of:
   providing an airbag cushion made of fabric material (12);
   placing the cushion (10, 10A) in a vacuum bag (20) and evacuating the air to create a vacuum and shrinking the airbag cushion to a compacted size;
   providing a shape forming contoured surface (102a) of a mandrel (102) against or within which the airbag cushion (10, 10A) is positioned on the mandrel and draped over the contoured surface (102a) of the mandrel to be drawn tightly over the contoured surface (102a) of the mandrel (102) to follow the contour during the step of creating a vacuum and presetting the cushion at a temperature up to 200° C. to set the cushion fabric material (12) to take the contour of the mandrel (102);
   placing the airbag cushion (10, 10A) in a high temperature environment between +50° C. to +140° C. for a predetermined time to thermally set the fabric material (12) to maintain the compacted airbag cushion shape; and
   releasing the vacuum and removing the thermally set airbag cushion (10, 10A) from the vacuum bag (20), the cushion maintaining the predetermined shape being formed as a mini pack or compacted airbag cushion (10, 10A).

2. The method of claim 1 wherein the predetermined time to thermally set the material (12) is up to 2 hours.

3. The method of claim 1 further comprises the step of:
   applying a compressive load or force on the evacuated airbag cushion (10, 10A) prior to the step of thermally setting the fabric material (12) and removing the compression force prior to removing the airbag cushion (10, 10A) from the vacuum bag (20).

4. The method of claim 1 further comprises the step of:
folding the airbag cushion (10, 10A) prior to placing it in the vacuum bag (20).

5. A method of forming a folded airbag cushion (10, 10A) comprises the steps of:
providing an airbag cushion made of fabric material (12);
inserting a simulator of an inflator (40) in the cushion (10, 10A) to mimic the shape of an inflator (40), the simulator providing a contour surface for the airbag, the airbag cushion being folded with the simulator inside;
placing the folded cushion (10, 10A) with the simulator in a vacuum bag (20) and evacuating the air to create a vacuum and shrinking the airbag cushion to a compacted size;
providing a shape forming contoured surface (102*a*) of a mandrel (102) against or within which the airbag cushion (10, 10A) is positioned on the mandrel and draped over the contoured surface (102*a*) of the mandrel to be drawn tightly over the contoured surface (102*a*) of the mandrel (102) to follow the contour during the step of creating a vacuum and presetting the cushion at a temperature up to 200° C. to set the cushion fabric material (12) to take the contour of the mandrel (102);
placing the airbag cushion (10, 10A) in a high temperature environment at 85° C. for 1.5 hours to thermally set the fabric material (12) to maintain the compacted airbag cushion shape;
releasing the vacuum and cooling the cushion and removing the thermally set airbag cushion (10, 10A) from the vacuum bag (20), after cooling removing the simulator and replacing the simulator with a live inflator, the cushion maintaining the predetermined shape being formed as a mini pack or compacted airbag cushion (10, 10A).

6. The method of claim 1 further comprises the step of:
assembling the airbag cushion (10, 10A) about a curtain airbag fixture, dire or mandrel prior to the step of evacuation.

7. The method of claim 1 further comprises the step of:
placing the formed airbag cushion (10, 10A) in an airbag module housing (30) to form a module assembly.

8. The method of claim 1 wherein the relaxed folded airbag cushion (10, 10A) retains a size reduction in thickness in the range of 20% to 40% smaller compared to the same cushion folded but not processed using the method of claim 1.

9. A compacted airbag cushion (10, 10A) made by the method of claim 1.

10. A compacted airbag cushion (10, 10A) of claim 9 further comprising a module housing for storing the mini pack airbag cushion (10, 10A).

* * * * *